V. J. BURRY.
SIDE BEARING FOR CARS.
APPLICATION FILED JULY 16, 1917.

1,344,858.

Patented June 29, 1920.

INVENTOR
Vincent J. Burry

UNITED STATES PATENT OFFICE.

VINCENT J. BURRY, OF CHICAGO, ILLINOIS, ASSIGNOR TO JOLIET RAILWAY SUPPLY COMPANY, OF CHICAGO, ILLINOIS, A CORPORATION OF ILLINOIS.

SIDE BEARING FOR CARS.

1,344,858.  Specification of Letters Patent.  Patented June 29, 1920.

Application filed July 16, 1917. Serial No. 180,803.

*To all whom it may concern:*

Be it known that I, VINCENT J. BURRY, a citizen of the United States, and resident of Chicago, in the county of Cook and State of Illinois, have invented a new and useful Improvement in Side Bearings for Cars; and I do hereby declare the following to be a full, clear, and exact description thereof.

My invention relates to side-bearings for railway-cars.

The object of my invention is to provide a side-bearing of simple and strong construction that will provide for free rolling travel for normal conditions and a sliding travel, for abnormal. If the body-plate in abnormal condition should cause a flat spot, this would not be objectionable with my construction, as it will be clearly seen that the roller will not make a complete revolution, so, therefore, a flat spot at this point on the circumference, would not affect the normal action of the roller.

To these ends my invention comprises the novel features hereinafter set forth and claimed.

Figure 1:
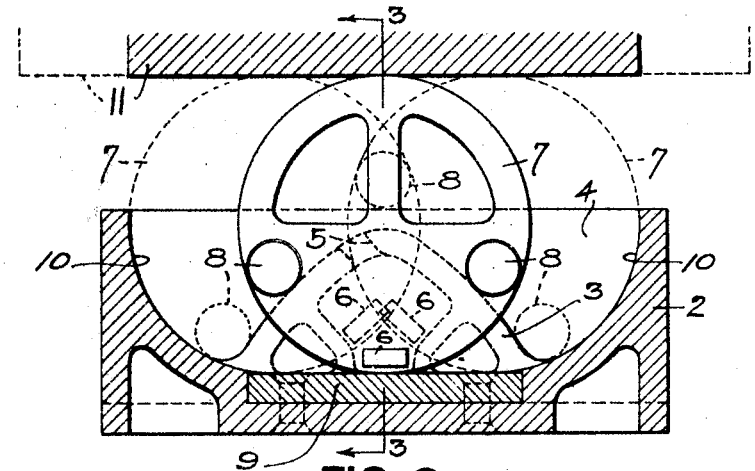
Figure 2:
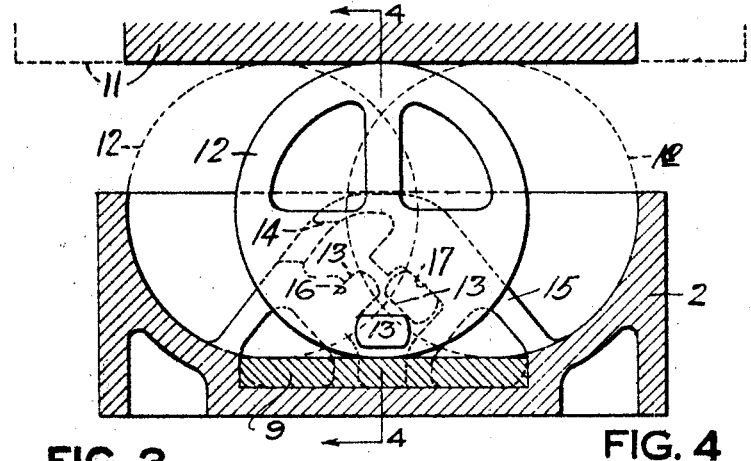
Figure 3:
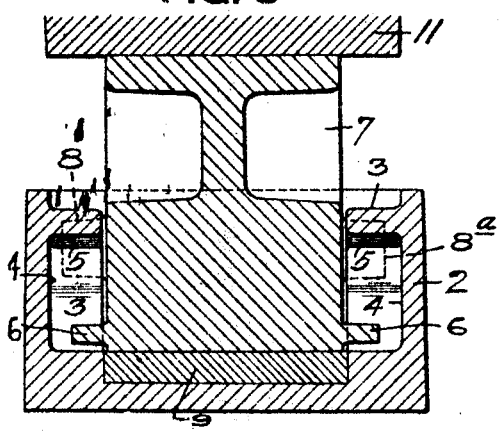
Figure 4:
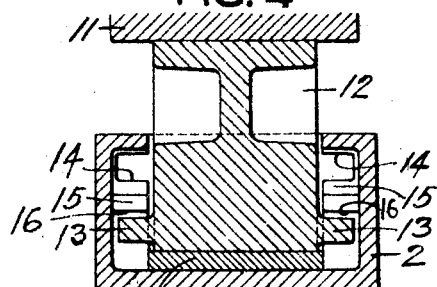

In the accompanying drawing, Figure 1 is a sectional view of my improved bearing showing the roller in normal position in full lines, and its limited movement in dotted lines; Fig. 2 is a modified form of my invention; Fig. 3 is a section on the line 3—3, Fig. 1; and Fig. 4 is a section on the line 4—4, Fig. 2.

In the drawings, the numeral 2 designates the lower bearing block or housing provided with the guides 3 at each side thereof and projecting inwardly from the inner sidewalls 4 of the housing. These guides are provided with the openings 5 for the admission of the lugs 6 on the roller 7. The lugs 6 are inserted lengthwise through the openings 5, and when the roller is in normal position, the lugs 6 take the position indicated in Fig. 1 and prevent the roller from being disengaged accidentally from the guides.

The rollers 7 have the studs 8, 8ª or projections formed thereon, which are adapted to engage the outer faces of the guides 3 at each side thereof when the roller is in normal position, as indicated in Fig. 1.

A wear-plate 9 is riveted or otherwise secured to the bottom of the housing 2, which plate may be replaced from time to time as found necessary.

The ends of the housing are preferably curved as at 10 to conform to the curve of the roller, and said roller engages these curved ends of the housing when it reaches its limit of movement.

The plate 11 on the body-bolster or the bolster itself is adapted to bear on the roller in the ordinary manner.

When the roller is shifted by the action of the movement of the plate 11, either to the right or to the left, the rotation of the roller in either direction is limited by the studs 8, which move down into the space between the bottom of the guides 3 and the curved walls 10 of the housing, as indicated in dotted lines, Fig. 1, with the roller engaging the curved walls 10 of the housing on the side opposite the direction of movement of the roller. The other studs leave the guide and take a position above the top of the guide until the roller returns to normal position. This prevents the further rotation of the roller, and the further movement of the plate 11 is provided for by its sliding along the stationary roller. The roller will return by gravity to normal position.

In case this sliding of the plate 11 on the roller forms a flat spot, it is apparent that by thus limiting the rotation of the roller so that it cannot make a complete or even a half revolution, said flat spot will never come around in position to engage the wear-plate 9 and so interfere with the free rolling of the roller.

In Fig. 2, I have illustrated a modified form of my invention in which the roller 12 is provided with lugs 13, which are inserted in the openings 14 in the guides 15, and said lugs when in normal position assume the position indicated in full lines Fig. 2. The abutments 16 and 17 are provided, which are engaged by the lugs 13 accordingly as the roller is moved to the left or right, as clearly indicated in dotted lines, Fig. 2. These lugs, in the same manner as above, control the amount of movement of the roller and prevent its making a complete revolution or rolling sufficiently in either direction to bring any flat spot formed by the sliding of the plate 11 on the roller down into position to engage the wear-plate and so interfere with the rolling of the roller.

By my invention, therefore, I provide a very simple and efficient form of side-bearing in which there is a free rolling travel for normal condition, and the roller is of a floating type, which is free to move, with no chance of its becoming wedged or fixed in position. While I have shown a roller in the drawing, it is apparent that a rocker may be employed, the term roller and rocker being used to mean the same thing.

By locking the roller in the housing, I am enabled to reduce the height of the housing, for otherwise the walls of the housing would have to be carried up higher in order to prevent the roller from being misplaced. It is apparent that the roller-bearing may be reversed without affecting its operation.

What I claim is:

1. A roller bearing for railway cars comprising a housing, a single roller in said housing, single faced guides at opposite sides of said housing having upwardly converging guide faces, projections on each end of said roller at opposite sides of said guides, and means for controlling the rolling movement of said roller to less than a complete revolution in either direction.

2. A roller bearing for railway cars comprising a housing, a single roller in said housing, single faced guides at opposite sides of said housing having upwardly converging guide faces, projections on each end of said roller at opposite sides of said guides, and end portions on said housing with which the roller engages in either direction to limit the travel of said roller to less than a complete revolution.

3. A roller bearing for railway cars comprising a housing, a single roller within said housing, guides at opposite sides of said housing having upwardly converging guide faces, projections on each end of said roller at opposite sides of said guides, and curved ends on said housing, whereby when said roller comes into engagement with one of said ends the projections on that side will seat themselves in the space formed by the juncture of said conical guides with said curved end.

4. A roller bearing for railway cars comprising a housing, a roller contained within said housing, inclosures formed on the inner sides of said housing, abutments in said inclosures, and projections on said roller located in said inclosures and adapted to engage said abutments as the roller moves in either direction.

In testimony whereof I, the said VINCENT J. BURRY, have hereunto set my hand.

VINCENT J. BURRY.

Witnesses:
JOHN F. WILL,
JOHN R. KELLER.